(12) United States Patent
Shiota

(10) Patent No.: US 11,697,240 B2
(45) Date of Patent: Jul. 11, 2023

(54) BLOWN FILM FORMING APPARATUS

(71) Applicant: SUMITOMO HEAVY INDUSTRIES MODERN, LTD., Kanagawa (JP)

(72) Inventor: Takahiro Shiota, Kanagawa (JP)

(73) Assignee: SUMITOMO HEAVY INDUSTRIES MODERN, LTD., Kanagawa (JP)

( * ) Notice: Subject to any disclaimer, the term of this patent is extended or adjusted under 35 U.S.C. 154(b) by 154 days.

(21) Appl. No.: 17/219,056

(22) Filed: Mar. 31, 2021

(65) Prior Publication Data

US 2021/0299931 A1 Sep. 30, 2021

(30) Foreign Application Priority Data

Mar. 31, 2020 (JP) ................................. 2020-062983

(51) Int. Cl.
*B29C 48/92* (2019.01)
*B29C 48/325* (2019.01)
(Continued)

(52) U.S. Cl.
CPC .......... *B29C 48/92* (2019.02); *B29C 48/0018* (2019.02); *B29C 48/325* (2019.02);
(Continued)

(58) Field of Classification Search
CPC . B29C 48/0018; B29C 48/10; B29C 48/2528; B29C 48/32; B29C 48/325;
(Continued)

(56) References Cited

U.S. PATENT DOCUMENTS

| 3,461,501 A * | 8/1969 | Stewart | B29C 48/32 |
| | | | 425/381 |
| 5,110,518 A * | 5/1992 | Halter | B29C 48/92 |
| | | | 425/141 |

(Continued)

FOREIGN PATENT DOCUMENTS

| EP | 3381650 A1 | 10/2018 |
| JP | S50-106467 U | 9/1975 |

(Continued)

OTHER PUBLICATIONS

Extended Search Report issued in European Application No. 21165984. 2, dated Aug. 9, 2021.

*Primary Examiner* — Xiao S Zhao
*Assistant Examiner* — Joseph S Leyson
(74) *Attorney, Agent, or Firm* — Michael Best & Friedrich LLP

(57) ABSTRACT

Provide is a blown film forming apparatus including a die including a columnar inner peripheral member and a cylindrical outer peripheral member that surrounds the inner peripheral member, and extruding a resin from a lip formed between the inner peripheral member and the outer peripheral member, and a plurality of die lip drive mechanisms including a fluid pressure actuator as a drive source and adjusting a lip width by applying a radial load to the outer peripheral member, in which the outer peripheral member includes a plurality of load receiving portions to which a load is applied by the die lip drive mechanism, and a stiffness reducing portion that is provided between the plurality of load receiving portions.

19 Claims, 15 Drawing Sheets

(51) Int. Cl.
*B29C 55/28* (2006.01)
*B29C 48/00* (2019.01)

(52) U.S. Cl.
CPC .... *B29C 55/28* (2013.01); *B29C 2948/92152* (2019.02); *B29C 2948/92428* (2019.02); *B29C 2948/92647* (2019.02); *B29C 2948/92904* (2019.02)

(58) Field of Classification Search
CPC .......... B29C 48/327; B29C 48/92; B29C 2948/92133; B29C 2948/92152; B29C 2948/92428; B29C 2948/92647; B29C 2948/92904; B29C 55/28
See application file for complete search history.

(56) References Cited

U.S. PATENT DOCUMENTS

| | | |
|---|---|---|
| 2017/0015043 A1 | 1/2017 | Shimizu et al. |
| 2018/0264704 A1* | 9/2018 | Nakano .................. B29C 48/10 |

FOREIGN PATENT DOCUMENTS

| | | |
|---|---|---|
| JP | 5634630 B1 | 12/2014 |
| JP | 2019-166797 A | 10/2019 |
| WO | 2019/188478 A1 | 10/2019 |

* cited by examiner

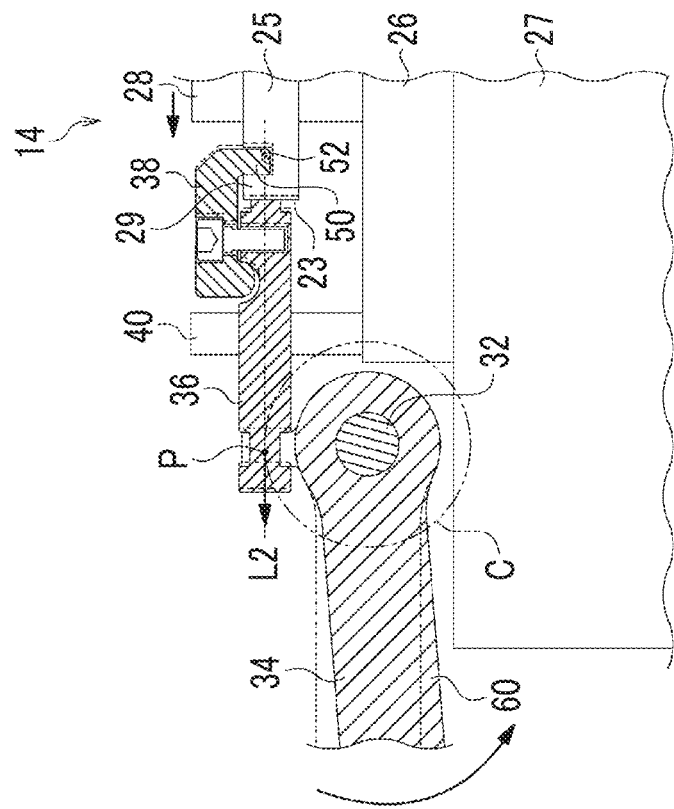
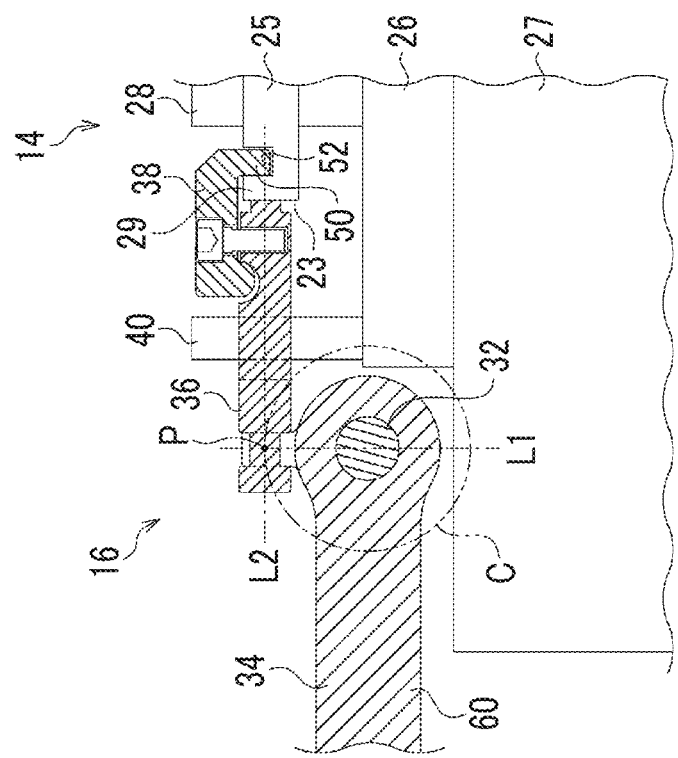

BLOWN FILM FORMING APPARATUS

RELATED APPLICATIONS

The content of Japanese Patent Application No. 2020-062983, on the basis of which priority benefits are claimed in an accompanying application data sheet, is in its entirety incorporated herein by reference.

BACKGROUND

Technical Field

A certain embodiment of the present invention relates to a blown film forming apparatus.

Description of Related Art

A blown film forming apparatus is known in which a melted resin is extruded into a tube shape from a ring-shaped discharge port (hereinafter referred to as a lip) formed in a die and air is blown into the inside to inflate the resin, thereby forming a thin film. In the related art, a blown film forming apparatus capable of applying a radial load to an outer peripheral member of a die, which defines the outer periphery of a lip, by a plurality of die lip drive mechanisms to at least partially adjust a lip width is proposed.

SUMMARY

According to an embodiment of the present invention, there is provided a blown film forming apparatus including: a die including a columnar inner peripheral member and a cylindrical outer peripheral member that surrounds the inner peripheral member, and extruding a resin from a lip formed between the inner peripheral member and the outer peripheral member; and a plurality of die lip drive mechanisms including a fluid pressure actuator as a drive source and adjusting a lip width by applying a radial load to the outer peripheral member. The outer peripheral member includes a plurality of load receiving portions to which a load is applied by the die lip drive mechanism, and a stiffness reducing portion that is provided between the plurality of load receiving portions.

BRIEF DESCRIPTION OF THE DRAWINGS

FIGS. 9A and 9B are explanatory diagram for explaining an operation of the die lip drive mechanism in FIG. 2.

DETAILED DESCRIPTION

Figure 1:
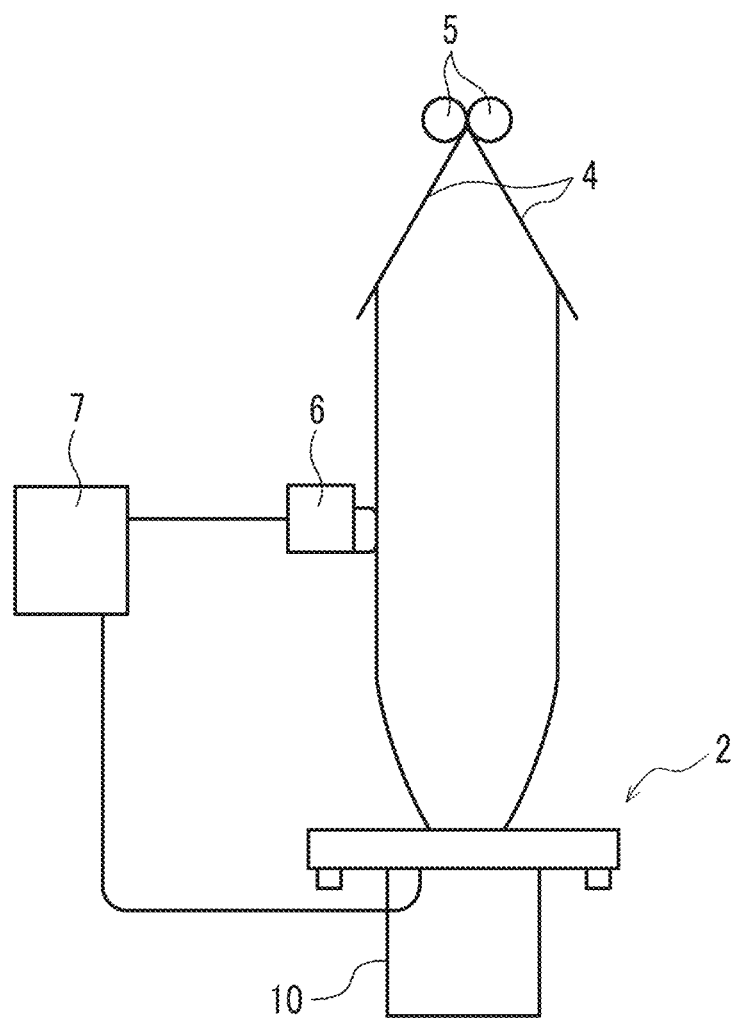
FIG. 1 is a diagram showing a schematic configuration of a blown film forming apparatus according to an embodiment.

In the blown film forming apparatus, when the maximum driving amount of the lip can be increased, the range in which the uneven thickness of the film can be adjusted is widened, and thus a higher quality film can be formed. When the maximum driving force of an actuator of the die lip drive mechanism is increased, the maximum driving amount of the lip can be increased. However, it is not realistic in terms of cost to increase the maximum driving force of the actuator any more.

It is desirable to provide a blown film forming apparatus having a relatively large maximum lip driving amount even at a low cost.

Any combination of the above components or embodiments in which the components or expressions of the present invention are replaced with each other between methods, apparatuses, systems, or the like are also effective as aspects of the present invention.

According to the present invention, a blown film forming apparatus having a relatively large maximum lip driving amount even at a low cost can be provided.

Hereinafter, the present invention will be described based on a preferred embodiment with reference to the drawings. The embodiment does not limit the invention, but is exemplification, and all the features or combinations thereof described in the embodiment are not necessarily essential to the invention. Identical or corresponding components, members, and processing shown in each drawing are denoted by the same reference numerals, and overlapping description is omitted appropriately.

FIG. 1 is a diagram showing a schematic configuration of a blown film forming apparatus 1 according to an embodiment. The blown film forming apparatus 1 includes a die 10, a thickness adjustment part 2, a pair of stabilizers 4, a pinch roll 5, a thickness sensor 6, and a control device 7.

A melted resin is supplied from an extruder (not shown) to the die 10. The melted resin is extruded from a ring-shaped lip 18a (described later in FIG. 2) formed at the die 10, and thus a tubular film is formed.

The thickness adjustment part 2 adjusts a film thickness and cools the film.

The pair of stabilizers 4 is disposed above the thickness adjustment part 2 and guides the tubular film between the pair of pinch rolls 5. The pinch rolls 5 are disposed above the stabilizers 4 and flatly folds the guided film while pulling up the guided film. The flatly folded film is wound by a winder (not shown).

The thickness sensor 6 is disposed between the thickness adjustment part 2 and the stabilizers 4. The thickness sensor 6 repeatedly measures the film thickness of the tubular film over the entire circumference in a predetermined period. The thickness sensor 6 in this embodiment measures the film thickness over the entire circumference while rotating around the tubular film. The film thickness data measured by the thickness sensor 6 is transmitted to the control device 7.

The control device 7 is a device that comprehensively controls the blown film forming apparatus 1. For example, the control device 7 controls the thickness adjustment part 2, based on the film thickness data measured by the thickness sensor 6, and keeps the film thickness within an allowable range over the entire circumference.

Figure 2:
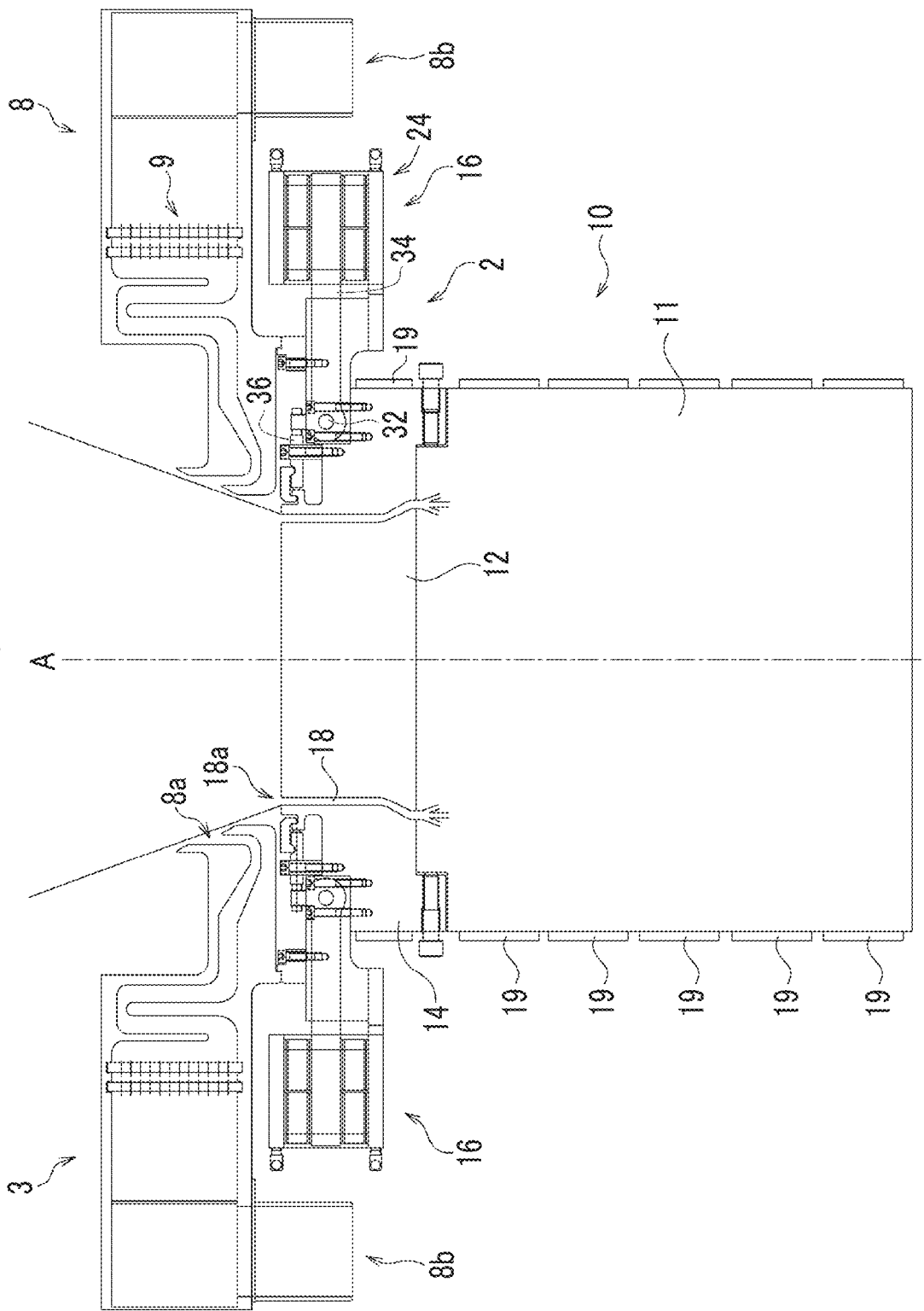
FIG. 2 is a vertical sectional view of a die and a thickness adjustment part in FIG. 1.
Figure 3:
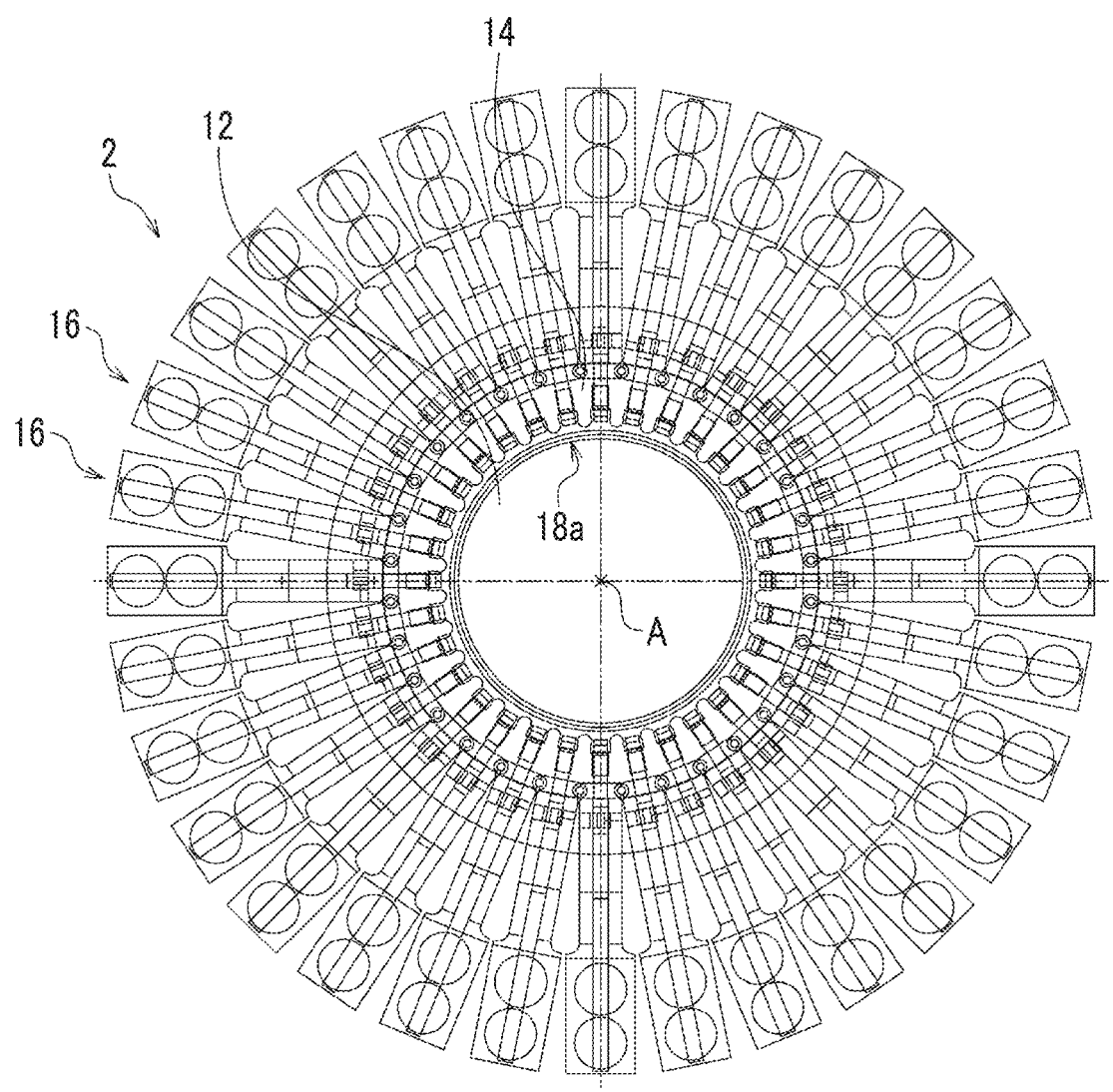
FIG. 3 is a top view of the die and the thickness adjustment part in FIG. 1.

FIG. 2 is a vertical sectional view of the die 10 and the thickness adjustment part 2. FIG. 3 is a top view of the die 10 and the thickness adjustment part 2. In FIG. 3, illustration of a cooling device 3 is omitted.

The die 10 includes a die main body 11, an inner peripheral member 12, and an outer peripheral member 14. The inner peripheral member 12 is a columnar member that is placed on the upper surface of the die main body 11. The expression "columnar" as used herein includes not only a perfect columnar shape but also a substantially columnar shape. The outer peripheral member 14 is an annular member and surrounds the inner peripheral member 12. A slit 18 extending in a ring shape in an up-down direction is formed between the inner peripheral member 12 and the outer peripheral member 14. The melted resin flows to the upper side through the slit 18, and the melted resin is extruded from the lip 18a that is an upper end opening of the slit 18.

A plurality of heaters 19 are mounted on the outer periphery of the die main body 11. The heater 19 is also mounted on the outer periphery of the outer peripheral member 14. The die main body 11 and the outer peripheral member 14 are heated to a required temperature by the heaters 19. In this way, the melted resin flowing inside the die 10 can be maintained at an appropriate temperature and in a melted state.

The thickness adjustment part 2 includes the cooling device 3 and a plurality of die lip drive mechanisms 16.

The cooling device 3 is fixed above the plurality of die lip drive mechanisms 16. The cooling device 3 includes an air ring 8 and an annular rectifying member 9. The air ring 8 is a ring-shaped casing having an inner peripheral portion recessed downward. A plurality of hose ports 8b are formed in an outer peripheral portion of the air ring 8 at equal intervals in a circumferential direction. A hose (not shown) is connected to each of the plurality of hose ports 8b, and cooling air is sent into the air ring 8 through the hose from a blower (not shown).

A ring-shaped outlet 8a open to the upper side is formed in the inner peripheral portion of the air ring 8. The cooling air sent into the air ring 8 is blown out from the outlet 8a and blown onto the resin.

The rectifying member 9 is disposed in the air ring 8 so as to surround the outlet 8a. The rectifying member 9 rectifies the cooling air sent into the air ring 8. In this way, the cooling air is blown out from the outlet 8a at a uniform flow rate and wind speed in the circumferential direction.

The plurality of die lip drive mechanisms 16 are disposed, for example, at equal intervals in the circumferential direction so as to surround the upper end side of the outer peripheral member 14. Here, the number of die lip drive mechanisms 16 is 32. However, there is no limitation thereto. The plurality of die lip drive mechanisms 16 are mounted to the outer peripheral member 14 in a cantilever manner.

Each of the plurality of die lip drive mechanisms 16 is configured to be able to apply a radially inward pressing load or a radially outward tensile load to the outer peripheral member 14. The outer peripheral member 14 is elastically deformed by a pressing load or a tensile load that is applied thereto. Therefore, by adjusting the plurality of die lip drive mechanisms 16, the width of the lip 18a (hereinafter referred to as a lip width) can be adjusted partially in the circumferential direction, and thus the film thickness can be controlled partially in the circumferential direction. In a case where variation occurs in the film thickness in the circumferential direction, for example, a tensile load is applied to the outer peripheral member 14 by the die lip drive mechanism 16 corresponding to a thin wall portion (for example, located below the thin wall portion) to widen the lip width below the thin wall portion. In this way, the variation in film thickness is reduced.

Figure 4:
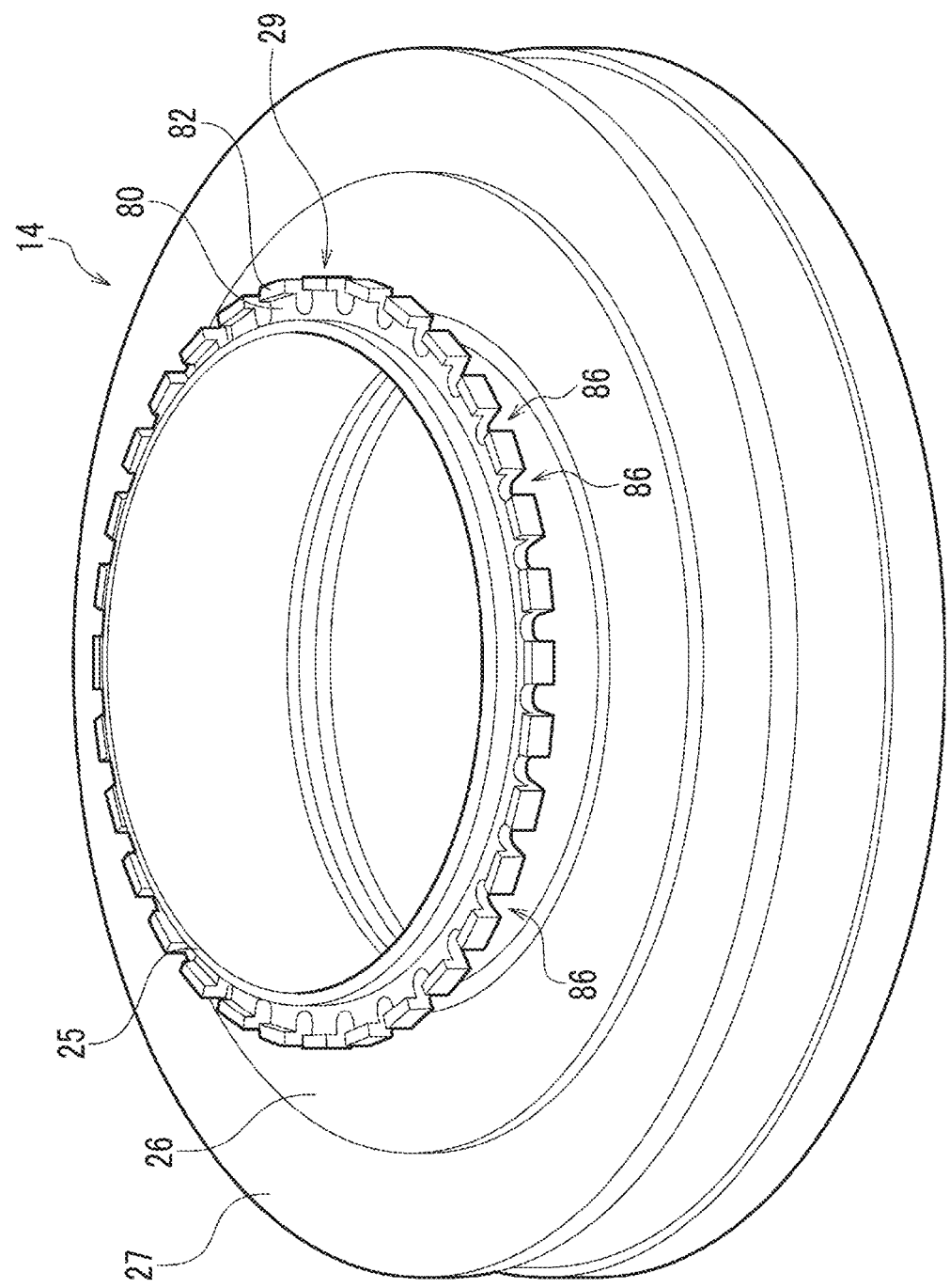
FIG. 4 is a perspective view showing an upper portion of an outer peripheral member in FIG. 2.
Figure 5:
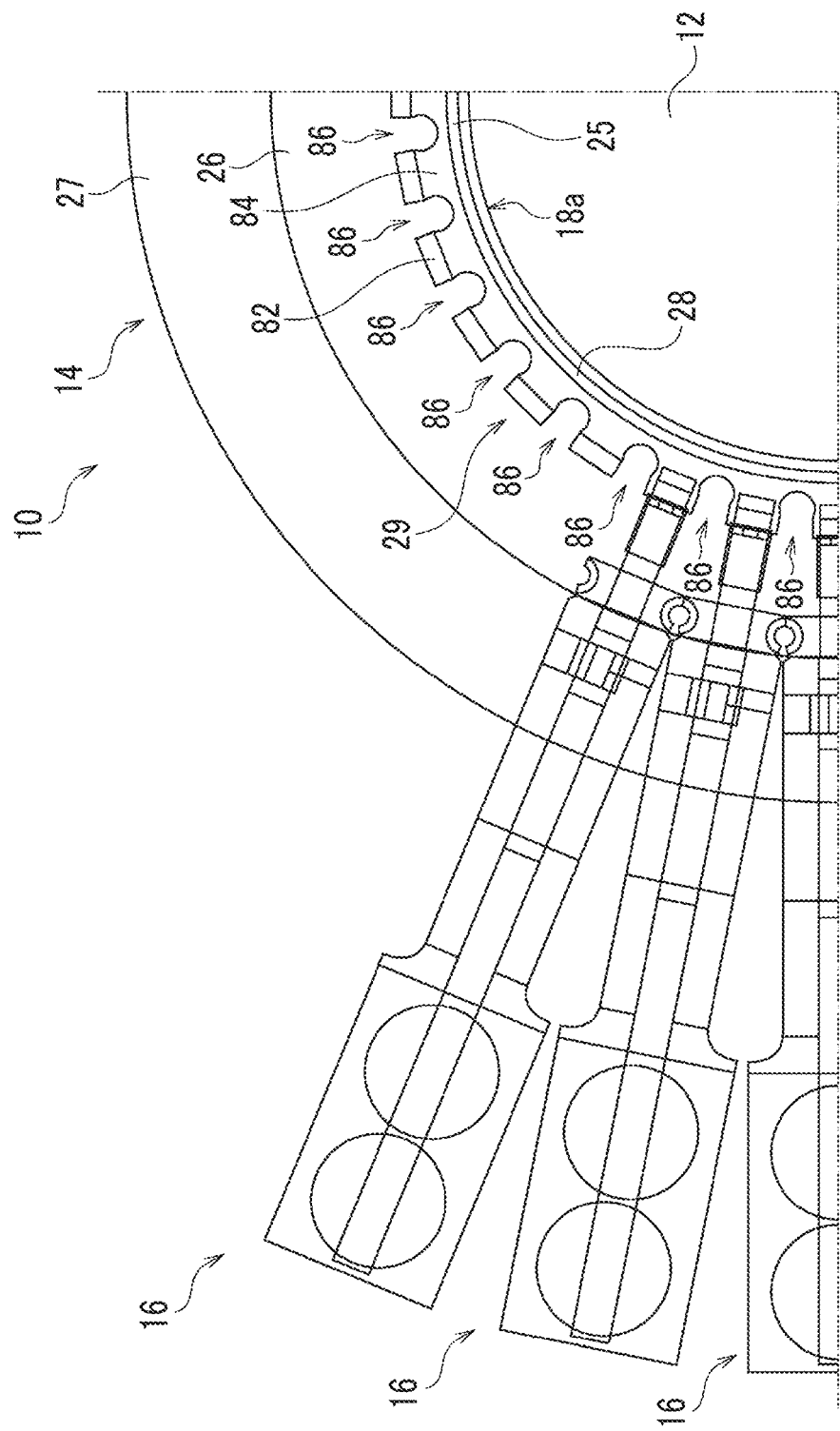
FIG. 5 is a top view showing a part of the outer peripheral member in FIG. 2 in an enlarged manner.

FIG. 4 is a perspective view showing an upper portion of the outer peripheral member 14. FIG. 5 is a top view showing a part of the outer peripheral member 14 in an enlarged manner. In FIG. 5, illustration of some of the die lip drive mechanisms 16 is omitted.

The upper portion of the outer peripheral member 14 has a small-diameter portion 25, a medium-diameter portion 26 formed below the small-diameter portion 25 to have a diameter larger than that of the small-diameter portion 25, and a large-diameter portion 27 formed below the medium-diameter portion 26 to have a diameter larger than that of the medium-diameter portion 26. The small-diameter portion 25 includes a cylindrical main body 28, and an annular flange portion 29 that protrudes radially outward from the outer periphery of the main body 28. The expression "cylindrical" as used herein includes not only a perfect cylindrical shape but also a substantially cylindrical shape. The flange portion 29 includes an extension portion 80 protruding radially outward from the main body 28, and a standing wall portion 82 rising from an end portion on the outer periphery side of the extension portion 80. The cross section of the flange portion 29 has an inverted L shape.

Cutouts 86 as stiffness reducing portions that reduce the radial stiffness of the small-diameter portion 25 are formed in the flange portion 29 at equal intervals in the circumferential direction. The cutout 86 is formed so as to straddle the standing wall portion 82 and the extension portion 80. The cutout 86 as the stiffness reducing portion is formed in the flange portion 29, whereby the radial stiffness of the flange portion 29 and thus the small-diameter portion 25 is reduced, and thus the small-diameter portion 25 can be deformed with a smaller driving force as compared with a case where there is no stiffness reducing portion, and therefore, the driving amount of the lip width that is obtained with the same driving force is increased. That is, the maximum driving amount of the lip width is increased, and the range in which an uneven thickness can be adjusted is widened. Further, in other words, since the same driving force as that in the related art can be obtained with a smaller driving force, a fluid pressure actuator 24 having a lower maximum driving force can be adopted, and a reduction in cost and downsizing of the fluid pressure actuator 24 can be achieved. Further, the stiffness reducing portion is formed in the small-diameter portion 25 to reduce the radial stiffness of the small-diameter portion 25, whereby a circumferential range of the small-diameter portion 25 that is deformed in a case where the driving force of a certain die lip drive mechanism 16 is changed can be narrowed as compared with a case where the stiffness reducing portion is not formed, and it becomes possible to adjust the uneven thickness in a finer range in the circumferential direction.

The cutout 86 is formed, in the flange portion 29, at a position that avoids a load receiving portion of the standing wall portion 82 and a portion of the extension portion 80, which is located radially inside the load receiving portion. That is, the cutout 86 is formed, in the flange portion 29, at a no-load receiving portion of the standing wall portion 82 and a portion of the extension portion 80, which is located radially inside the no-load receiving portion. The "load receiving portion" is a portion of the standing wall portion 82, to which the die lip drive mechanism 16 is connected, in the flange portion 29, and is a portion of the standing wall portion 82, to which a load is applied by the die lip drive mechanism 16. The "no-load receiving portion" is a portion of the standing wall portion 82 between the load receiving portions adjacent to each other, and is a portion of the standing wall portion 82, to which the die lip drive mechanism 16 is not connected and therefore a load is not applied by the die lip drive mechanism 16.

When the cutout 86 is formed in the load receiving portion, it becomes difficult for the load by the die lip drive mechanism 16 to be transmitted to the flange portion 29. However, in this embodiment, since the cutout 86 is formed in the no-load receiving portion and the portion of the extension portion 80, which is located radially inside the no-load receiving portion, this can be avoided. Further, the cutout 86 is formed between the load receiving portion and the load receiving portion (that is, in the no-load receiving portion), whereby even if a corresponding load receiving portion (that is, to which the die lip drive mechanism 16 is connected) is deformed by a certain die lip drive mechanism 16, the load receiving portion adjacent thereto is not affected or little affected. In this way, in order to adjust the lip width at a certain circumferential position, it is sufficient if the driving force of the die lip drive mechanism 16 at the circumferential position is controlled, and thus the control of the lip width becomes simple. In this example, the cutouts 86 are formed in all the no-load receiving portions. However, there is no limitation thereto, and it is sufficient if the cutout 86 is formed in at least one the no-load receiving portions.

The cutout 86 extends from the upper end of the standing wall portion 82 to the lower end of the standing wall portion 82, and further extends in the extension portion 80 radially inward from there. The radially inner end portion of the cutout 86 is arcuate when viewed in a plan view.

Figure 6:
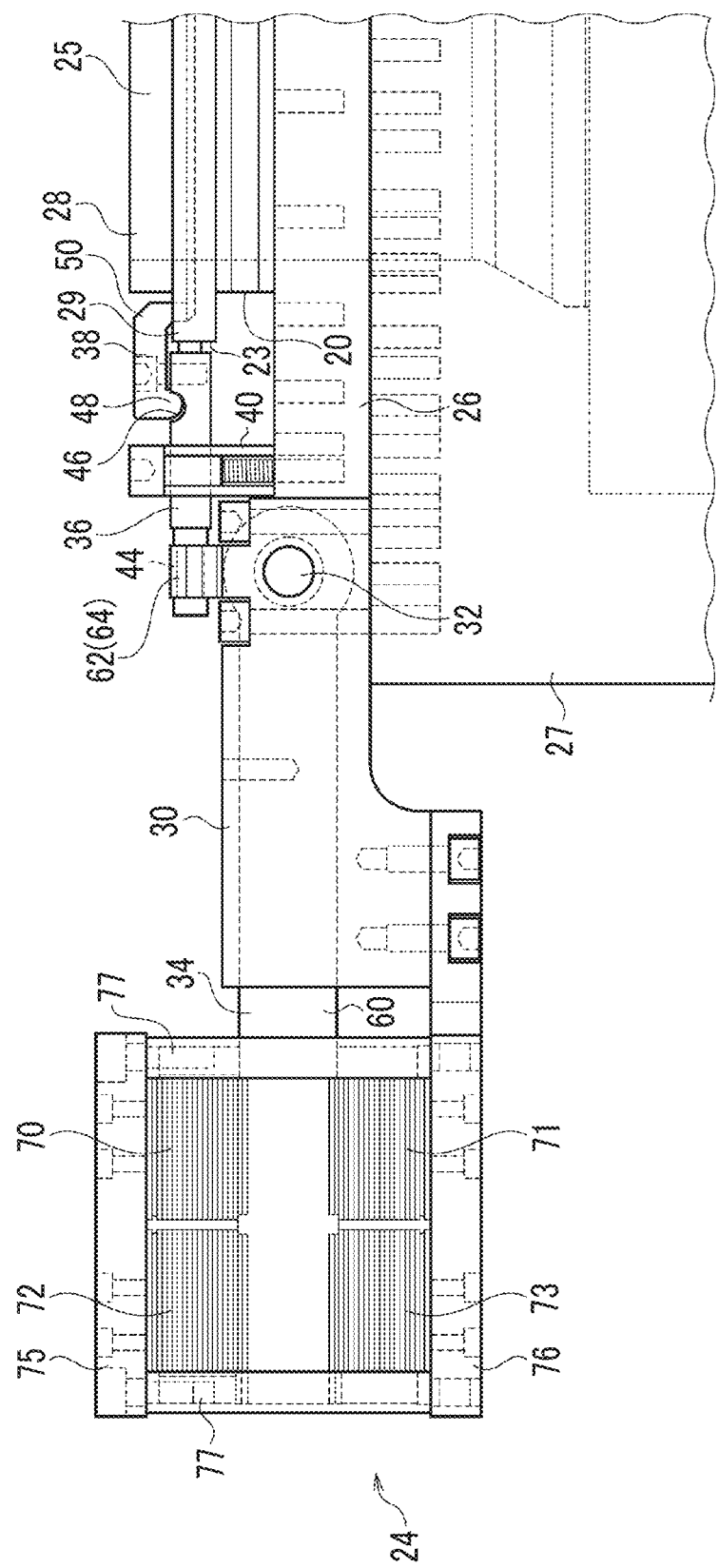
FIG. 6 is a side view showing an upper portion of the outer peripheral member in FIG. 2 and a die lip drive mechanism mounted thereto.
Figure 7:
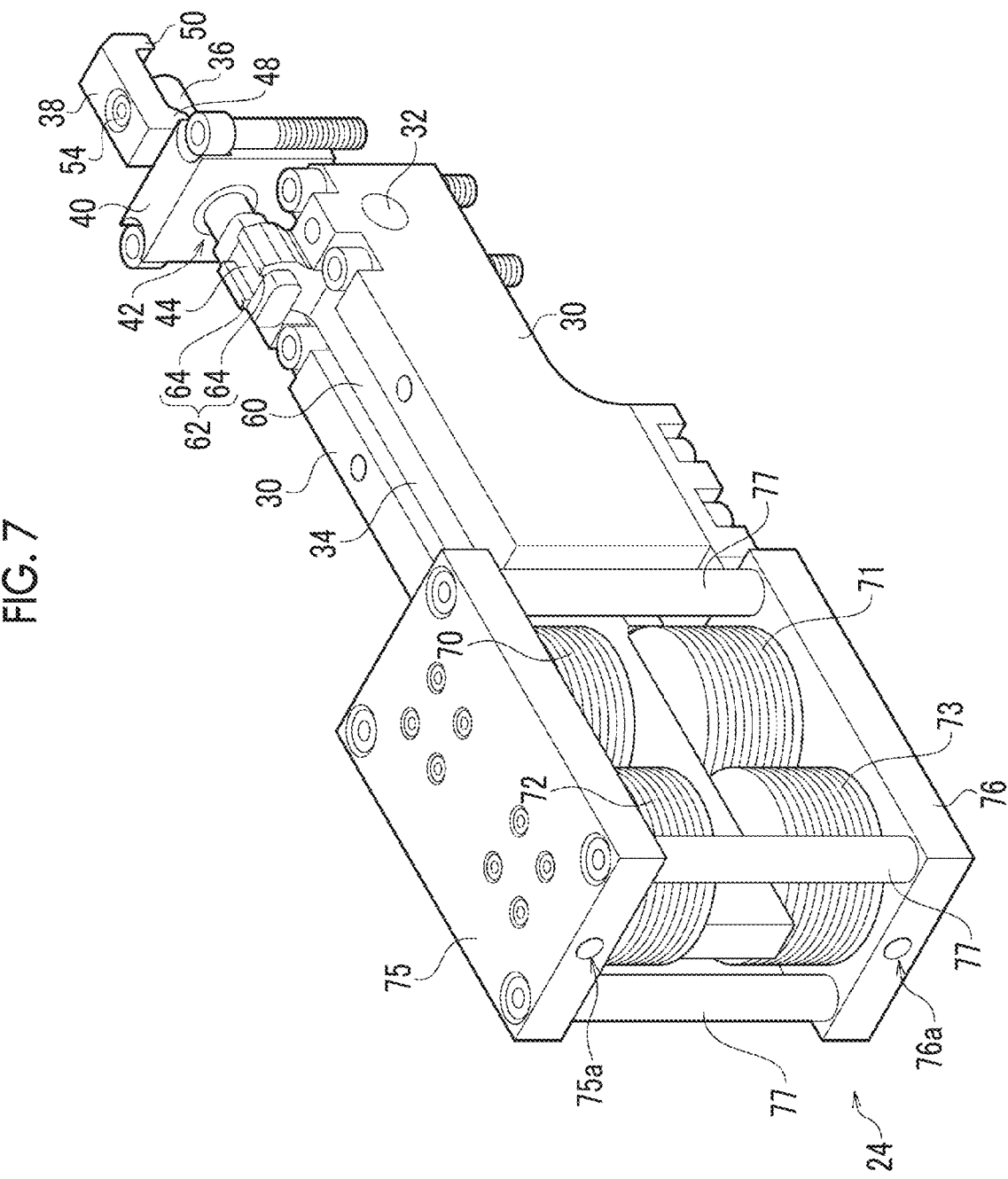
FIG. 7 is a perspective view showing the die lip drive mechanism in FIG. 2.
Figure 8:
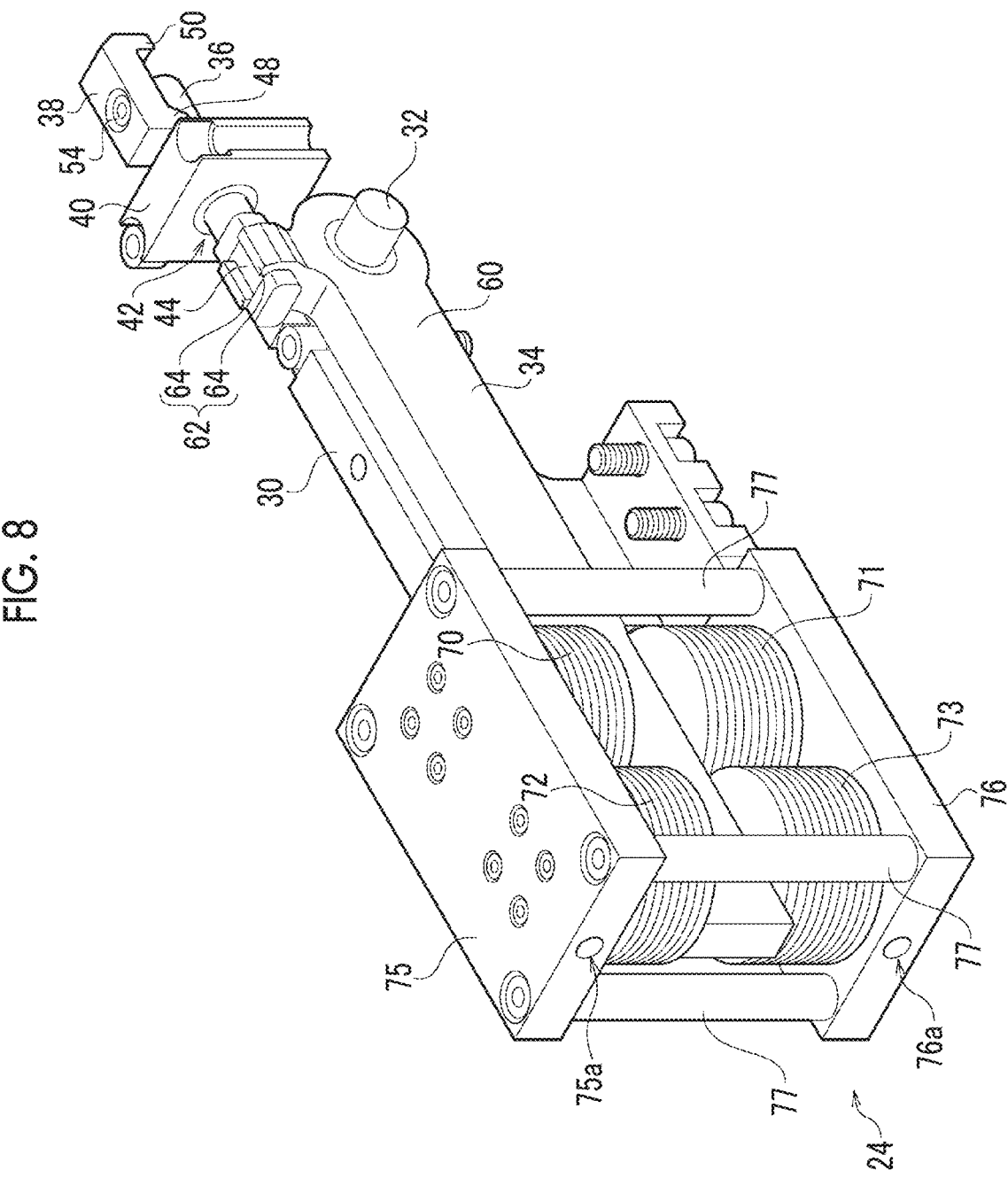
FIG. 8 is a perspective view showing the die lip drive mechanism in FIG. 2.

FIG. 6 is a side view showing the upper portion of the outer peripheral member 14 and the die lip drive mechanism 16 mounted thereto. FIGS. 7 and 8 are perspective views showing the die lip drive mechanism 16. In FIG. 8, there is shown a state where one of a pair of support members 30 is removed.

The die lip drive mechanism 16 includes a pair of support members 30 that is mounted to the outer peripheral member 14, a rotating shaft 32 that is fixed to the pair of support members 30, a lever 34 that is rotatably supported with the rotating shaft 32 as a fulcrum, an operation rod 36 that is operated in an axial direction by receiving the rotation force by the lever 34, a connection member 38 that connects the operation rod 36 and the flange portion 29 in the axial direction, a bearing member 40 that supports the operation rod 36 so as to be slidable in the axial direction, and the fluid pressure actuator 24 that applies a rotation force to the lever 34.

The pair of support members 30 is formed in a flat plate shape and is screwed to the outer peripheral member 14 so as to become parallel to each other. A space for interposing the lever 34 therein is provided between the pair of support members 30. The bearing member 40 is formed in a rect-angular parallelepiped shape and is screwed to the outer peripheral member 14 inside the support member 30 in the radial direction. In the bearing member 40, an insertion hole 42 penetrating it in the radial direction is formed. The inner peripheral surface of the insertion hole 42 configures a so-called slide bearing (an oil-free type bearing) and slidably supports the operation rod 36.

The rotating shaft 32 is fixed to the pair of support members 30 such that an axis thereof extends in the horizontal direction and is substantially orthogonal to the radial direction.

The operation rod 36 is formed in a stepped columnar shape, and an intermediate portion thereof is inserted into the insertion hole 42 of the bearing member 40. A reduced diameter portion 44 is provided on the outer side of the operation rod 36 in the axial direction. The reduced diameter portion 44 functions as a connection portion with the lever 34, as will be described later. A concave engaging portion 46 is provided on the inner side of the operation rod 36 in the axial direction. The engaging portion 46 functions as a connection portion with the connection member 38, as will be described later. The outer peripheral surface (hereinafter, referred to as a "pressure receiving surface 23") of the standing wall portion 82 of the flange portion 29 faces the tip end surface of the operation rod 36.

The connection member 38 is formed in a bifurcated shape when viewed in a vertical sectional view. Specifically, the connection member 38 is provided with engaging portions 48 and 50 protruding downward on the surface facing the outer peripheral member 14 in the axial direction. The engaging portion 48 has a shape substantially complementary to the shape of the engaging portion 46 of the operation rod 36. Further, an annular engaging groove 52 recessed downward in the axial direction is formed in the flange portion 29 of the small-diameter portion 25. The engaging portion 50 has a shape substantially complementary to the shape of the engaging groove 52.

The operation rod 36 and the connection member 38 are screwed together so that the engaging portion 48 of the connection member 38 is engaged with the engaging portion 46 of the operation rod 36 and the engaging portion 50 of the connection member 38 is engaged with the engaging groove 52 of the flange portion 29. The facing surfaces of the engaging portion 48 and the engaging portion 46 are tapered surfaces. In this way, the tip end surface of the operation rod 36 is pressed against the pressure receiving surface 23 of the flange portion 29 as the screw 54 is fastened, and the operation rod 36 and the flange portion 29 are firmly fixed. Apart of the flange portion 29 is clamped by the engaging portion 50 of the connection member 38 and the tip portion of the operation rod 36. In this way, the operation rod 36 is connected to the flange portion 29 and thus to the small-diameter portion 25 in the axial direction thereof.

The lever 34 has a long plate-shaped main body 60 extending in the radial direction, and one end portion thereof is rotatably supported by the rotating shaft 32. The lever 34 is provided such that the main body 60 and the operation rod 36 are substantially parallel to each other in a non-operation state. Further, a bifurcated connection portion 62 is provided so as to extend from one end portion of the main body 60 in a direction perpendicular to the axis of the main body 60. That is, the connection portion 62 is composed of a pair of connection pieces 64, and is configured such that the distance between the connection pieces 64 is slightly larger than the outer diameter of the reduced diameter portion 44 of the operation rod 36 and the widths of the connection pieces 64 are slightly smaller than the length of the reduced diameter portion 44. With such a configuration, the lever 34 and the operation rod 36 are connected in an aspect in which the connection portion 62 fits into the reduced diameter portion 44.

The fluid pressure actuator 24 is an actuator that is driven by fluid pressure. In this embodiment, the fluid pressure actuator is a pneumatically driven type. The fluid pressure actuator includes two sets of bellows 70, 72 and bellows 71, 73 that are operated by supply and discharge of compressed air, a first base 75, a second base 76 that is disposed on the lower side in the axial direction of the first base 75, and four connection rods 77. The first base 75 and the second base 76 are disposed to be separated from each other in the axial direction and are connected by the four connection rods 77. The bellows 70 and 72 are disposed between the lever 34 and the first base 75, and the bellows 71 and 73 are disposed between the lever 34 and the second base 76. That is, the end portion serving as a force point of the lever 34 is supported so as to be sandwiched between the bellows 70, 72 and the bellows 71, 73. Compressed air is supplied to one of the bellows 70, 72 and the bellows 71, 73, whereby the lever 34 is rotationally driven in the clockwise direction or the counterclockwise direction in the drawing.

In FIG. 6, when pressure is applied to the bellows 70 and 72 by the supply of the compressed air, so that the bellows 70 and 72 are extended, the lever 34 rotates in the counterclockwise direction in the drawing, and the rotation force is converted into a force to the left side in the axial direction (that is, to the outer side in the radial direction) of the operation rod 36. As a result, a tensile load is applied to the small-diameter portion 25, and a corresponding lip width (that is, on the inner side in the radial direction of the die lip drive mechanism 16) changes in a widening direction. On the other hand, when pressure is applied to the bellows 71 and 73 by the supply of the compressed air, so that the bellows 71 and 73 are extended, the lever 34 rotates in the clockwise direction in the drawing, and the rotation force is converted into a force to the right side in the axial direction (that is, to the inner side in the radial direction) of the operation rod 36. As a result, a pressing load is applied to the small-diameter portion 25, and a corresponding lip width changes in the narrowing direction.

In order to realize such pneumatic drive, the compressed air is supplied from a pressure regulator (not shown) through a supply path 75a formed in the first base 75 or a supply path 76a formed in the second base 76. The pressure regulator controls the pressure in the bellows 70 to 73, based on a control command from the control device 7.

FIGS. 9A and 9B are explanatory diagram for explaining the operation of the die lip drive mechanism 16. FIG. 9A shows a neutral state of the die lip drive mechanism 16 (a state where all the bellows 70 to 73 are not operated), and FIG. 9B shows an expanding operation state of the die lip drive mechanism 16 (a state where only the bellows 70 and 72 are operated).

According to the die lip drive mechanism 16, the rotation force of the lever 34 is directly applied to the operation rod 36 at an action point P. That is, the rotation force of the lever 34 is applied to the small-diameter portion 25 as a force in the axial direction of the operation rod 36. At that time, since the operation rod 36 is stably supported by the outer peripheral member 14, the force in the axial direction is efficiently transmitted to the small-diameter portion 25. As a result, it becomes possible to efficiently apply the driving force for the adjustment of the lip width.

In this embodiment, as shown in FIG. 9A, a configuration is made such that a straight line L1 connecting the connection point between the lever 34 and the operation rod 36 (the action point P of the lever 34) and the rotating shaft 32 (the fulcrum of the lever 34) is orthogonal to an axis L2 of the operation rod 36. In this way, a tangential direction to a virtual circle C passing through the action point P with the rotating shaft 32 as the center coincides with the axial direction of the operation rod 36.

Therefore, as shown in FIG. 9B, the direction at the action point P of the rotation force of the lever 34 coincides with the axial direction L2 of the operation rod 36. As a result, the rotation force of the lever 34 becomes the driving force in the axial direction L2 of the operation rod 36 as it is, and thus the transmission efficiency of the force can be maximized. That is, the driving force of the fluid pressure actuator 24 when the small-diameter portion 25 is operated to be expanded can be applied extremely efficiently (refer to a thick line arrow in the drawing).

Although not shown in the drawings, even in a narrowing operating state of the die lip drive mechanism 16 (a state in which only the bellows 71 and 73 are operated), the direction of the force in FIG. 9B is merely reversed, so that the direction at the action point P of the rotation force of the lever 34 coincides with the axial direction of the operation rod 36. As a result, as in the expanding operation, the rotation force of the lever 34 becomes the driving force in the axial direction of the operation rod 36 as it is, and thus the transmission efficiency of the force can be maximized. That is, according to the die lip drive mechanism 16, it becomes possible to efficiently apply the driving force for the adjustment of the lip width.

As long as it is a configuration in which the rotation force of the lever 34 is directly applied to the operation rod 36, there is no limitation to this embodiment. For example, a configuration may be adopted in which as a result of an extending direction of the connection portion 62 (a direction connecting the rotating shaft 32 and the action point P) and the axial direction of the operation rod 36 forming an acute angle or an obtuse angle, the direction at the action point P of the rotation force of the lever 34 (for convenience, also referred to as a "rotation force acting direction") and the axial direction of the operation rod 36 (for convenience, also referred to as an "axial force acting direction") do not coincide with each other. In that case, while the main body 60 and the operation rod 36 may be parallel to each other, the axis of the main body 60 and the extending direction of the connection portion 62 may form an acute angle or an obtuse angle. Alternatively, while the axis of the main body 60 and the extending direction of the connection portion 62 may form the right angle, the main body 60 and the operation rod 36 may not be parallel to each other. Alternatively, the axis of the main body 60 and the extending direction of the connection portion 62 may form an acute angle or an obtuse angle, and the main body 60 and the operation rod 36 may not be parallel to each other. Further, a configuration in which at least a part of the main body 60 has a bent portion or a curved portion (a configuration in which the axis cannot always be specified) may be adopted.

Figure 10:
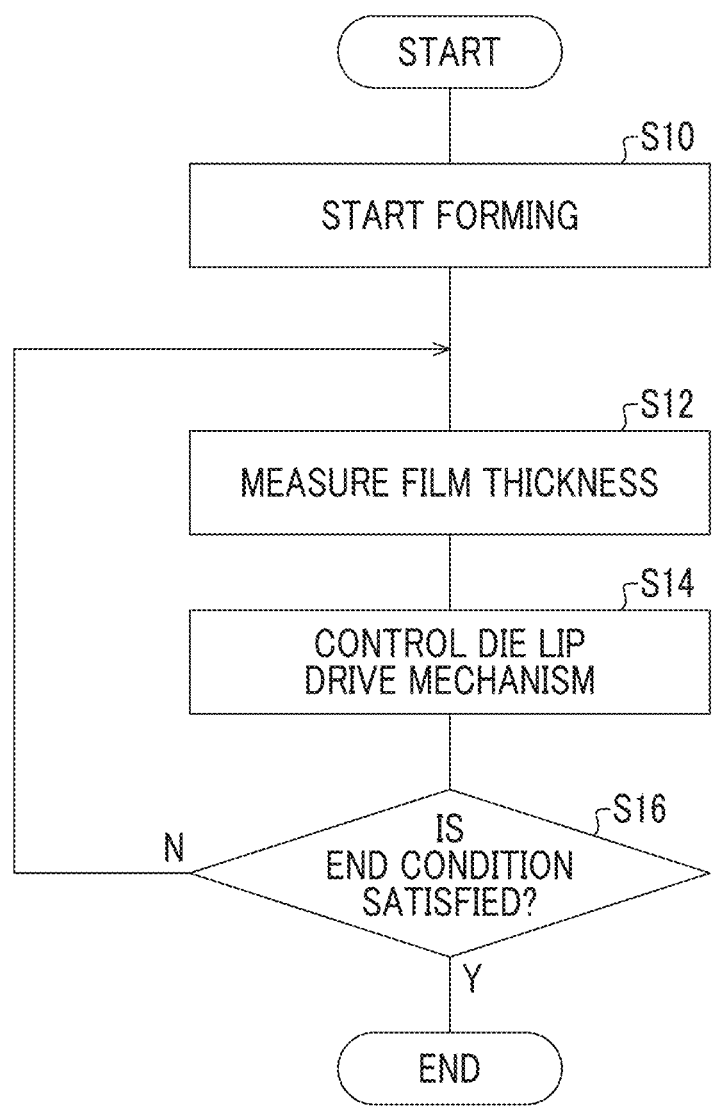
FIG. 10 is a flowchart showing an operation of the blown film forming apparatus of FIG. 1.

FIG. 10 is a flowchart showing the operation of the blown film forming apparatus 1. When a forming start signal is input, the control device 7 controls the extruder, the cooling device 3, the pinch rolls 5, and the like to start the forming of the film (S10). The forming start signal may be input through a forming start button (not shown).

The thickness sensor 6 measures the film thickness (S12). The control device 7 controls each of the plurality of die lip drive mechanisms 16, based on the film thickness data measured by the thickness sensor 6 (S14).

The control device 7 determines whether or not an end condition is satisfied (S16). In a case where the end condition is not satisfied (N in S16), the processing returns to step S12. In a case where the end condition is satisfied (Y in S16), the control device 7 ends the film forming. The end condition is that an end instruction is received from the outside or the forming is continued for a predetermined time.

The present invention has been described above based on the embodiment. This embodiment is exemplification, and it will be understood by those skilled in the art that various modification examples can be made by combinations of the respective components or the respective processing processes and that such modification examples are also within the scope of the present invention. Modification examples will be described below.

Modification Example 1

Figure 11:
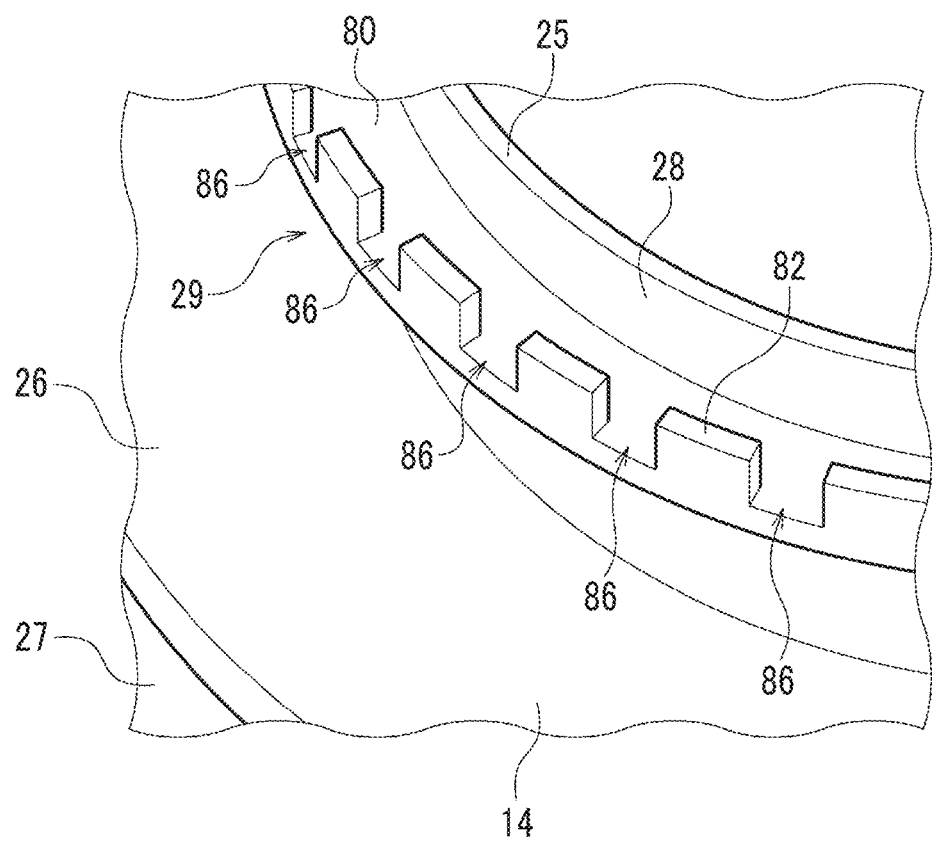
FIG. 11 is a perspective view showing an outer peripheral member according to a modification example.

In the embodiment, the cutout 86 as the stiffness reducing portion is formed so as to straddle the standing wall portion 82 and the extension portion 80. However, there is no limitation thereto. FIG. 11 is a perspective view showing an outer peripheral member 14 according to a modification example. In FIG. 11, the cutout 86 as the stiffness reducing portion is formed only in the standing wall portion 82. In FIG. 11, the cutout 86 reaches the lower end of the standing wall portion 82. However, the cutout 86 does not need to reach the lower end of the standing wall portion 82. According to this modification example, the same effect as that of the embodiment can be exhibited.

Modification Example 2

In the embodiment, the cutout 86 as the stiffness reducing portion is formed in the small-diameter portion 25. However, there is no limitation thereto.

Figure 12A:
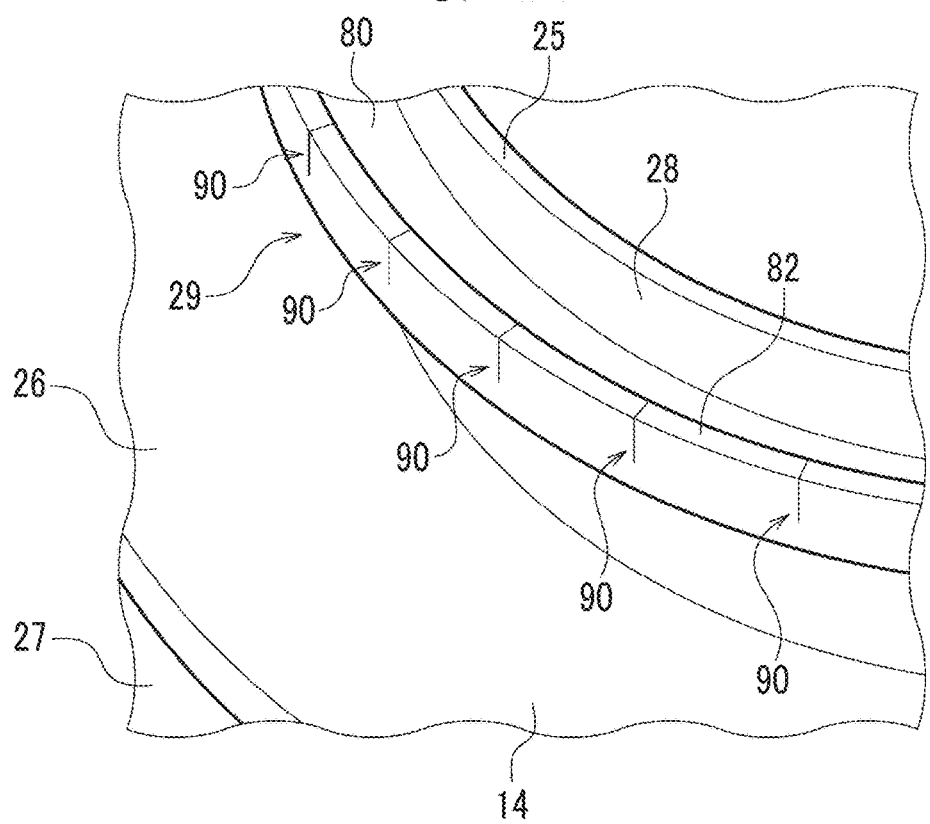
FIGS. 12A and 12B are perspective views showing an outer peripheral member according to another modification example.
Figure 12B:
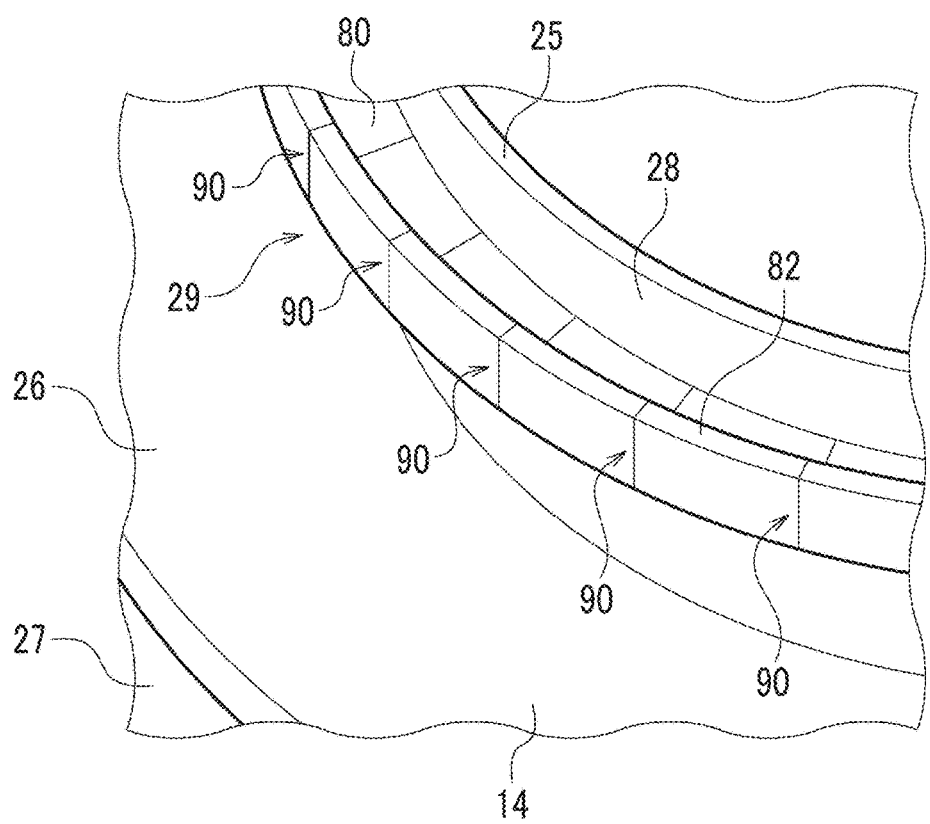

FIGS. 12A and 12B are perspective views showing an outer peripheral member 14 according to another modification example. In FIGS. 12A and 12B, a slit 90 as the stiffness reducing portion is formed instead of the cutout. In FIG. 12A, the slit 90 is formed only in the standing wall portion 82. In FIG. 12B, the slit 90 is formed so as to straddle the standing wall portion 82 and the extension portion 80. In FIGS. 12A and 12B, the slit 90 reaches the upper end of the standing wall portion 82. However, the slit 90 does not need to reach the upper end of the standing wall portion 82. In FIG. 12B, the slit 90 reaches the inner peripheral end of the extension portion 80. However, the slit 90 does not need to reach the inner peripheral end of the extension portion 80.

The slit 90 as the stiffness reducing portion may be formed in the no-load receiving portion. That is, the slit 90 as the stiffness reducing portion may be formed in at least one of the load receiving portion and the no-load receiving portion.

Figure 13A:
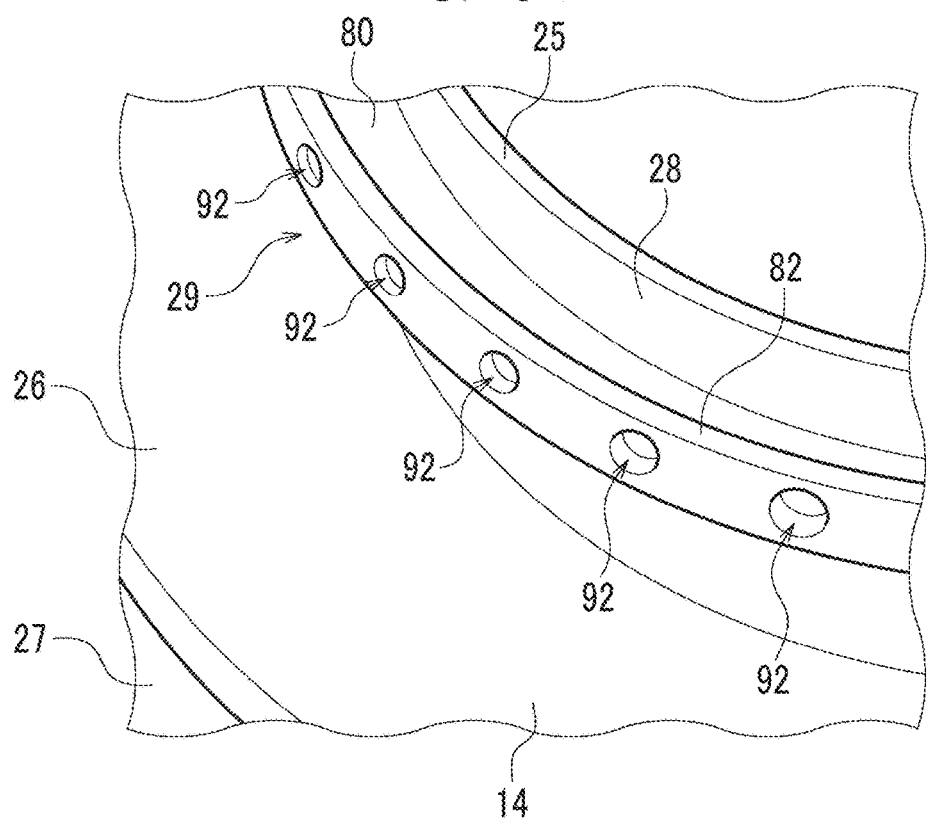
FIGS. 13A and 13B are perspective views showing an outer peripheral member according to still another modification example.
Figure 13B:
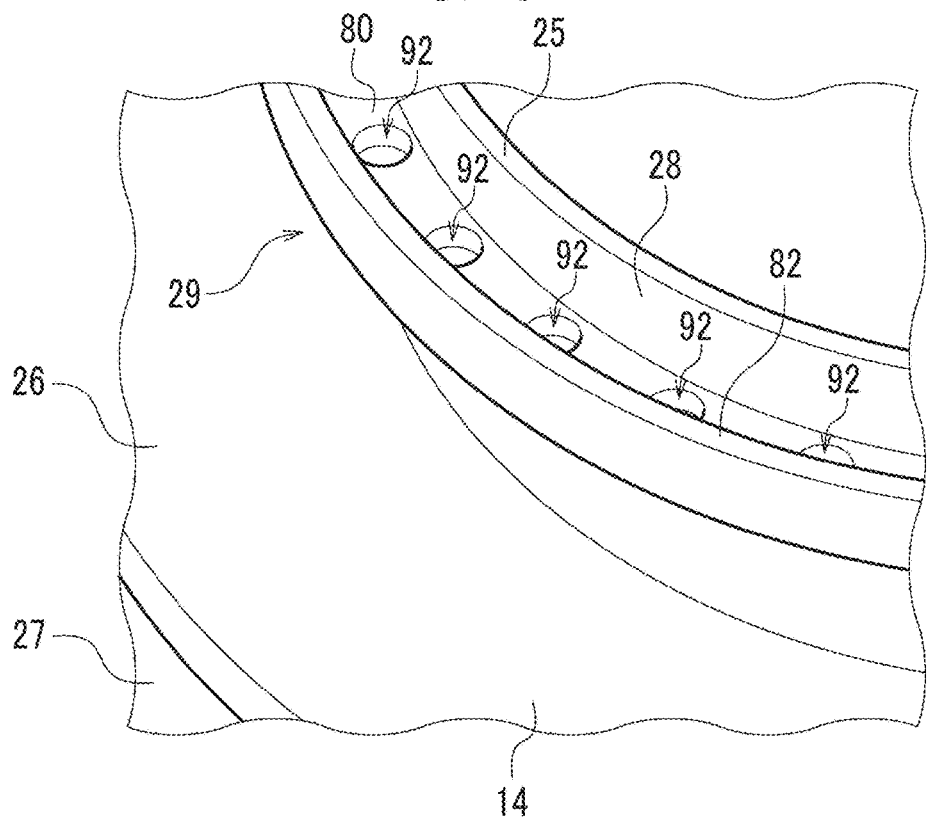

FIGS. 13A and 13B are perspective views showing an outer peripheral member 14 according to still another modification example. In FIGS. 13A and 13B, a through-hole 92 as the stiffness reducing portion is formed instead of the cutout. The opening shape of the through-hole 92 is not particularly limited, and may be, for example, a circular shape, an elliptical shape, a polygonal shape, or another shape.

In FIG. 13A, the through-hole 92 is formed only in the standing wall portion 82. In FIG. 13B, the through-hole 92 is formed only in the extension portion 80. The through-holes 92 may be formed in both the standing wall portion 82 and the extension portion 80 as a combination of FIGS. 13A and 13B. As a further modification example, the through-hole 92 may be formed in the boundary portion between the standing wall portion 82 and the extension portion 80.

The through-hole 92 as the stiffness reducing portion may be formed in the no-load receiving portion. That is, the through-hole 92 as the stiffness reducing portion may be formed in at least one of the load receiving portion and the no-load receiving portion.

Figure 14A:
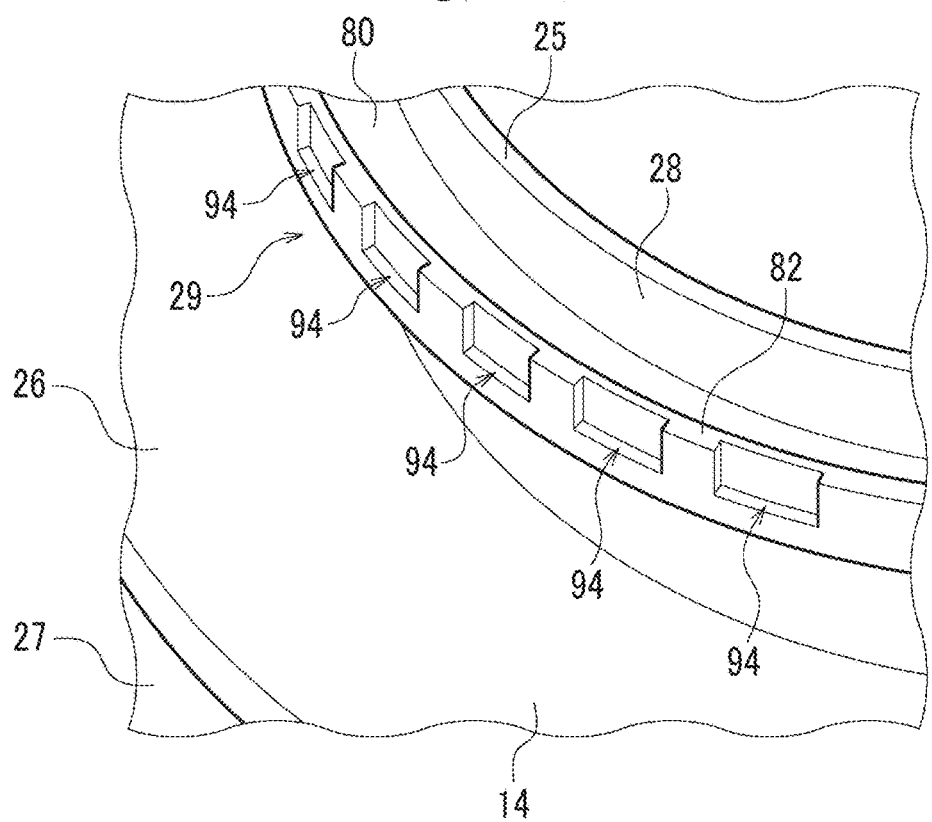
FIGS. 14A and 14B are perspective views showing an outer peripheral member according to still yet another modification example.
Figure 14B:
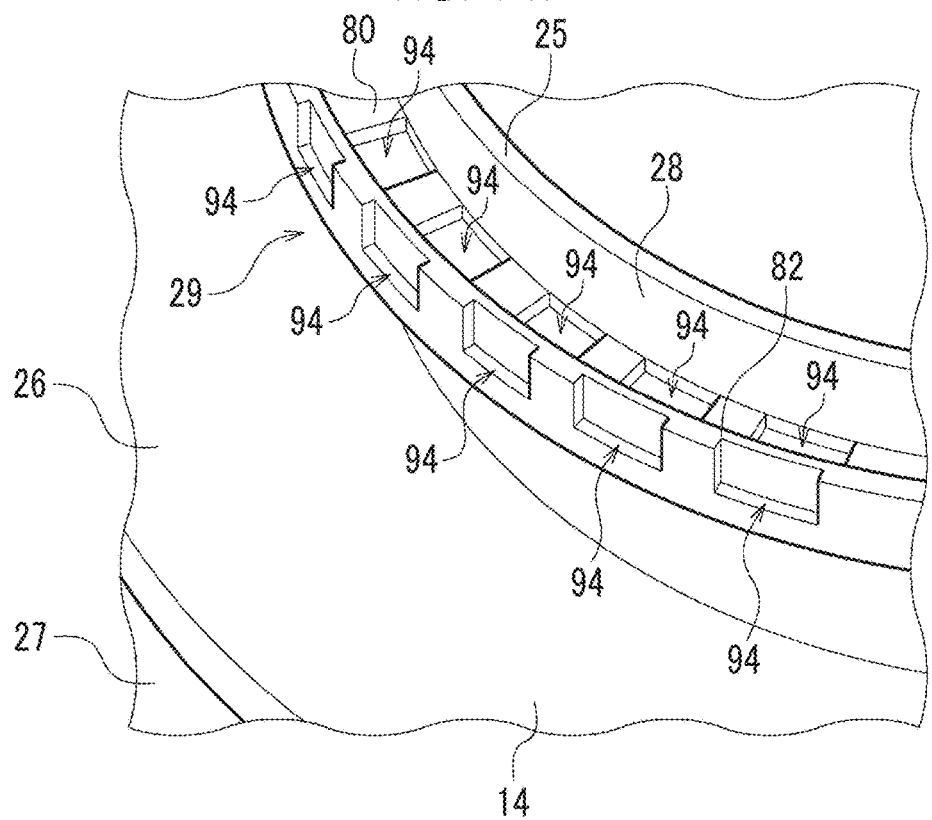

FIGS. 14A and 14B are perspective views showing an outer peripheral member 14 according to still yet another modification example. In FIGS. 14A and 14B, a thin thickness (portion) as the stiffness reducing portion is formed instead of the cutout. A thickness-reduced portion 94 can also be regarded as a recessed portion or a groove. A portion where the thickness-reduced portion 94 is formed becomes thin. The shape of the thickness-reduced portion 94 is not particularly limited.

In FIG. 14A, the thickness-reduced portion 94 is formed only in the standing wall portion 82. In FIG. 14B, the thickness-reduced portion 94 is formed only in the extension portion 80. In FIGS. 14A and 14B, the thickness-reduced portion 94 is formed on the outer peripheral surface of the standing wall portion 82. However, the thickness-reduced portion 94 may be formed on the inner peripheral surface of the standing wall portion 82. In FIG. 14B, the thickness-reduced portion 94 is formed on the upper surface of the extension portion 80. However, the thickness-reduced portion 94 may be formed on the lower surface of the extension portion 80. The thickness-reduced portions 94 may be formed in both the standing wall portion 82 and the extension portion 80 as a combination of FIGS. 14A and 14B. As a further modification example, the thickness-reduced portion 94 may be formed in the boundary portion between the standing wall portion 82 and the extension portion 80.

The thickness-reduced portion 94 as the stiffness reducing portion may be formed in the no-load receiving portion. That is, the thickness-reduced portion 94 as the stiffness reducing portion may be formed in at least one of the load receiving portion and the no-load receiving portion.

According to the above modification examples, the same effect as that of the embodiment can be exhibited.

Modification Example 3

In the embodiment and the modification examples described above, the case where one type of stiffness reducing portion that is any one of the cutout 86, the slit 90, the through-hole 92, and the thickness-reduced portion 94 is formed in the flange portion 29 has been described. However, any plural types of stiffness reducing portions may be formed in the flange portion 29.

Modification Example 4

Figure 15:
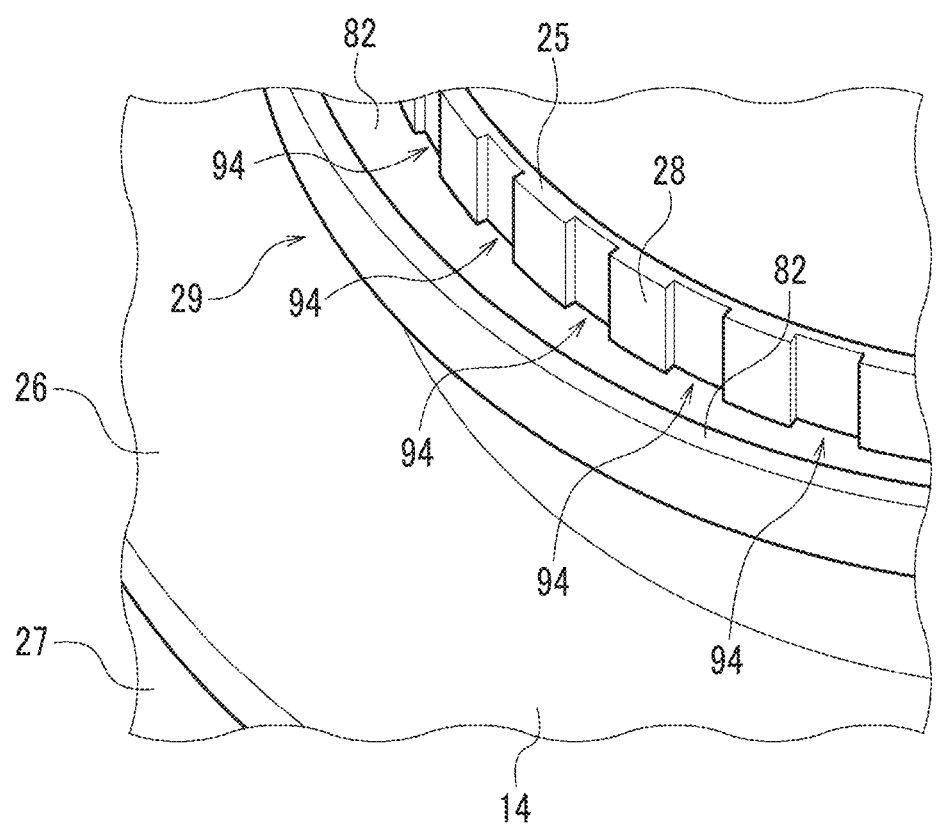
FIG. 15 is a perspective view showing an outer peripheral member according to further another modification example.

In the embodiment and the modification examples described above, the case where the stiffness reducing portions are formed in the flange portion 29 has been described. However, the stiffness reducing portions may be formed on the outer periphery of the main body 28, instead of the flange portion 29 or in addition to the flange portion 29. FIG. 15 is a perspective view showing an outer peripheral member 14 according to further another modification example. In this example, the thickness-reduced portion 94 as the stiffness reducing portion is formed on the outer peripheral surface of the main body 28. In the outer peripheral member 14, a slit may be formed instead of the thickness-reduced portion 94. The slit may be formed so as not to reach the inner peripheral end of the main body 28.

Any combination of the embodiment and modification examples described above is also useful as an embodiment of the present invention. A new embodiment that is made by the combination has the effects of each of the embodiment and the modification example that are combined.

It should be understood that the invention is not limited to the above-described embodiment, but may be modified into various forms on the basis of the spirit of the invention. Additionally, the modifications are included in the scope of the invention.

What is claimed is:

1. A blown film forming apparatus comprising:
   a die including a substantially columnar inner peripheral member and a substantially cylindrical outer peripheral member that surrounds the inner peripheral member, and extruding a resin from a lip formed between the inner peripheral member and the outer peripheral member; and
   a plurality of die lip drive mechanisms including a fluid pressure actuator as a drive source and adjusting a lip width by applying a radially outward tensile load to the outer peripheral member,
   wherein the outer peripheral member includes a plurality of tensile load receiving portions to each of which a tensile load is applied by the respective die lip drive mechanism, and a stiffness reducing portion that is provided between the plurality of tensile load receiving portions.

2. The blown film forming apparatus according to claim 1, wherein the outer peripheral member includes a substantially cylindrical main body that defines an outer periphery of the lip, and a flange portion that protrudes radially outward from an outer periphery of the main body, and
   the flange portion includes the plurality of tensile load receiving portions, and the stiffness reducing portion that is provided between the plurality of tensile load receiving portions.

3. The blown film forming apparatus according to claim 2,
   wherein the flange portion includes an extension portion protruding radially outward from the main body, and a standing wall portion rising from an end portion on an outer periphery side of the extension portion, and
   an inner peripheral surface of the standing wall portion includes the plurality of tensile load receiving portions.

4. The blown film forming apparatus according to claim 2,
   wherein a cross section of the flange portion has a substantially inverted L shape.

5. The blown film forming apparatus according to claim 2,
   wherein the die lip drive mechanism includes
     a pair of support members that is mounted to the outer peripheral member,
     a rotating shaft that is fixed to the pair of support members,
     a lever that is rotatably supported with the rotating shaft as a fulcrum,
     an operation rod that is operated in an axial direction by receiving a rotation force by the lever,
     a connection member that connects the operation rod and the flange portion in the axial direction,
     a bearing member that supports the operation rod so as to be slidable in the axial direction, and
     the fluid pressure actuator that applies the rotation force to the lever.

6. The blown film forming apparatus according to claim 5,
   wherein the pair of support members is formed in a substantially flat plate shape and is screwed to the outer peripheral member to be parallel to each other, and
   a space is provided between the pair of support members.

7. The blown film forming apparatus according to claim 6,
   wherein the bearing member is formed in a substantially rectangular parallelepiped shape and is screwed to the outer peripheral member inside the support member in a radial direction, and
   in the bearing member, an insertion hole penetrating the bearing member in the radial direction is formed.

8. The blown film forming apparatus according to claim 7,
   wherein the rotating shaft is fixed to the pair of support members such that an axis thereof extends in a horizontal direction and is orthogonal to the radial direction.

9. The blown film forming apparatus according to claim 7,
   wherein the operation rod is formed in a substantially stepped columnar shape, and an intermediate portion of the operation rod is inserted into the insertion hole of the bearing member,
   a reduced diameter portion that functions as a connection portion with the lever is provided on an outer side of the operation rod in the axial direction, and
   a concave engaging portion is provided on an inner side of the operation rod in the axial direction.

10. The blown film forming apparatus according to claim 9,
    wherein a recessed annular engaging groove is formed in the flange portion.

11. The blown film forming apparatus according to claim 10,
    wherein the connection member is formed in a bifurcated shape and is provided with a first engaging portion and a second engaging portion protruding downward on a surface facing the outer peripheral member, and
    the operation rod and the connection member are screwed together so that the first engaging portion of the connection member is engaged with the engaging portion of the operation rod and the second engaging portion of the connection member is engaged with the engaging groove of the flange portion.

12. The blown film forming apparatus according to claim 11,
    wherein facing surfaces of the first engaging portion and the engaging portion of the operation rod are tapered surfaces.

13. The blown film forming apparatus according to claim 1,
    wherein the stiffness reducing portion is at least one of a cutout, a slit, a through-hole, and a thickness-reduced portion.

14. The blown film forming apparatus according to claim 1,
    wherein the resin is extruded from the lip to form a tubular film, and
    the apparatus further comprises:
      a cooling device that is fixed above the die lip drive mechanism and cools the film;

a pair of stabilizers that is disposed above the cooling device and guides the film between a pair of pinch rolls;

the pair of pinch rolls being disposed above the pair of stabilizers and flatly folding the guided film while pulling up the film;

a thickness sensor disposed between the cooling device and the stabilizers; and a control device that controls each of the plurality of die lip drive mechanisms, based on a film thickness measured by the thickness sensor.

15. The blown film forming apparatus according to claim 14, wherein the thickness sensor repeatedly measures the film thickness of the film over an entire circumference in a predetermined period.

16. The blown film forming apparatus according to claim 14, wherein the cooling device includes an air ring and an annular rectifying member, the air ring is a ring-shaped casing including an inner peripheral portion recessed downward, a plurality of hose ports are formed in an outer peripheral portion of the air ring at equal intervals in a circumferential direction, a hose is connected to each of the plurality of hose ports, and cooling air is sent into the air ring through the hose from a blower, and a ring-shaped outlet open to an upper side is formed in the inner peripheral portion of the air ring and the cooling air sent into the air ring is blown out from the outlet and blown onto the resin.

17. The blown film forming apparatus according to claim 16, wherein the rectifying member is disposed in the air ring so as to surround the outlet, and the rectifying member rectifies the cooling air sent into the air ring.

18. The blown film forming apparatus according to claim 1, further comprising:

a heater that is mounted on an outer periphery of the outer peripheral member and heats the outer peripheral member.

19. The blown film forming apparatus according to claim 1, wherein the plurality of die lip drive mechanisms are disposed at equal intervals in a circumferential direction so as to surround an upper end side of the outer peripheral member.

\* \* \* \* \*